United States Patent [19]

Stumpf

[11] 4,039,799
[45] Aug. 2, 1977

[54] DEVICE FOR CUTTING SHEET MATERIAL

[76] Inventor: Gunter Stumpf, 7421 Mehrstetten, Kr., Munsingen, Germany

[21] Appl. No.: 603,862

[22] Filed: Aug. 11, 1975

Related U.S. Application Data

[63] Continuation of Ser. No. 472,207, May 21, 1974, abandoned.

[30] Foreign Application Priority Data

May 22, 1973    Germany ............................ 193110

[51] Int. Cl.² ............................................ B23K 26/00
[52] U.S. Cl. ................................. 219/121 L; 269/296; 269/163; 248/188.4
[58] Field of Search ........ 219/121 L, 121 LM, 121 P; 269/296, 53, 54, 321 A, 54.4; 248/176, 177, 178, 188.2, 188.4, 23, 174

[56] References Cited

U.S. PATENT DOCUMENTS

| | | | |
|---|---|---|---|
| 1,949,262 | 2/1934 | Stromelly | 269/54.5 X |
| 2,890,883 | 6/1959 | Brookhouser | 269/296 |
| 3,175,820 | 3/1965 | Schiler | 269/296 |
| 3,424,413 | 1/1969 | Applegate | 248/188.4 |
| 3,736,402 | 5/1973 | Mefferd | 219/121 LA X |
| 3,761,675 | 9/1973 | Mason | 219/121 L X |
| 3,828,159 | 8/1974 | Zoot | 219/121 LM |
| 3,931,491 | 1/1976 | Stumpf | 219/121 L X |
| 3,944,203 | 3/1976 | Brekelbaum | 269/296 |

Primary Examiner—J. V. Truhe
Assistant Examiner—Mark Paschall

[57] ABSTRACT

A device for cutting layers of textile material by means of a thermal cutting beam, such as a laser beam, in which the material is supported on a perforated plate which allows dissipation of any heat imparted thereto. The plate is detachably mounted on vertically adjustable supports which engage the plate in the perforations thereof.

7 Claims, 3 Drawing Figures

DEVICE FOR CUTTING SHEET MATERIAL

This is a continuation of the parent application Ser. No. 472,207, now abandoned, filed May 21, 1974.

BACKGROUND a. Field of the Invention:

This invention relates to a device for cutting sheet material, such as foils and layers of textile material, by means of a thermal cutting beam, the device having support means for supporting the sheet material to be cut.

b. Prior Art:

It is known to employ a laser beam for cutting material, the action of the laser beam being substantially a torch-cutting effect. The laser beam must, for this purpose, be focussed on the cutting location. As this is done, the laser beam generates a considerable amount of heat not only directly at the level of the cutting location but also in the zones located therebelow. If the material to be cut is a material which is not rigid, for example, a textile material, then it is necessary to lay it on a table. Consequently, the table is subjected to a considerable degree of heating and thermal stress due to the laser beam.

SUMMARY OF THE INVENTION

The present invention provides a device for cutting sheet material by means of a thermal cutting beam, including plate-like supporting means having holes therethrough and arranged to support said sheet material.

BRIEF DESCRIPTION OF THE DRAWING

In order that the invention may be clearly understood and readily carried into effect, reference will now be made, by way of example, to the accompanying drawings, in which.

DETAILED DESCRIPTION

Figure 1:
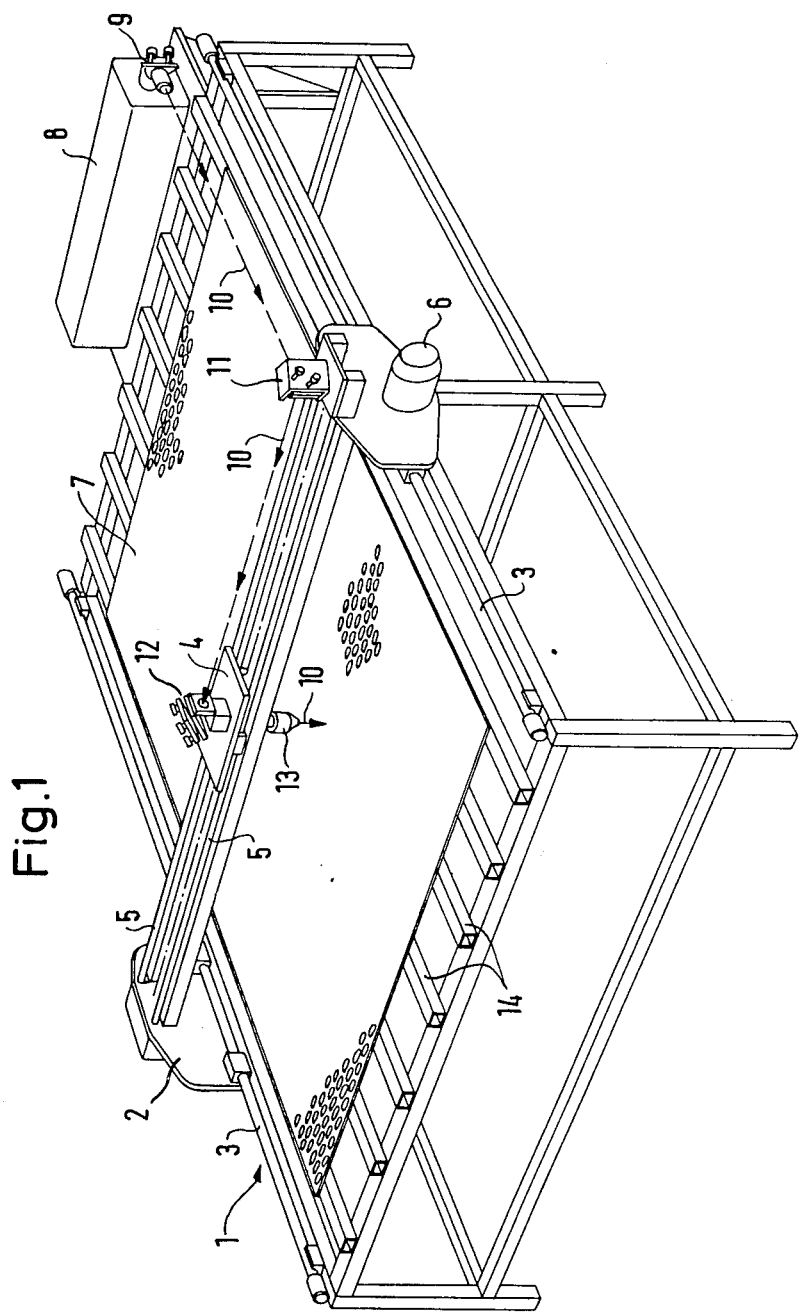
FIG. 1 is a perspective view of a device for cutting textile material by means of a laser beam.

The device shown in FIG. 1 comprises a table 1 on which a first carriage 2 is arranged to be displaced on rails 3 secured to the table 1. Mounted on the first carriage 2 is a second carriage 4 which is displaceable transversely of the direction of displacement of the first carriage 2. The first carriage 2 is provided for this purpose, with travel rails 5. The first carriage 2 is driven by means of a motor 6. The second carriage 4 is driven by means of a further drive (not shown).

The table 1 includes a plurality of bearer strips 14 from which there is supported (in a manner to be discussed later) a perforated table-top 7 providing plate-like supporting means. The table-top 7 is made from a material which is a good thermal conductor, for example from copper or brass.

A laser beam 10 is generated by means of a laser gun 8 and is radiated, by means of an optical system 9, to a first mirror assembly 11. The first mirror assembly 11 is disposed on the first carriage 2 and reflects the laser beam 10 to a second mirror assembly 12 on the second carriage 4. The second mirror assembly 12 reflects the laser beam 10 into a focussing device 13 which focusses the laser beam 10 at a point located a short distance above the surface of the perforated table-top 7.

Because it is perforated, the table-top 7 is not adversely affected by the heat generated by the laser beam 10, the heat imparted to the webs between the perforations being readily discharged or dissipated to the surroundings.

Figure 2:
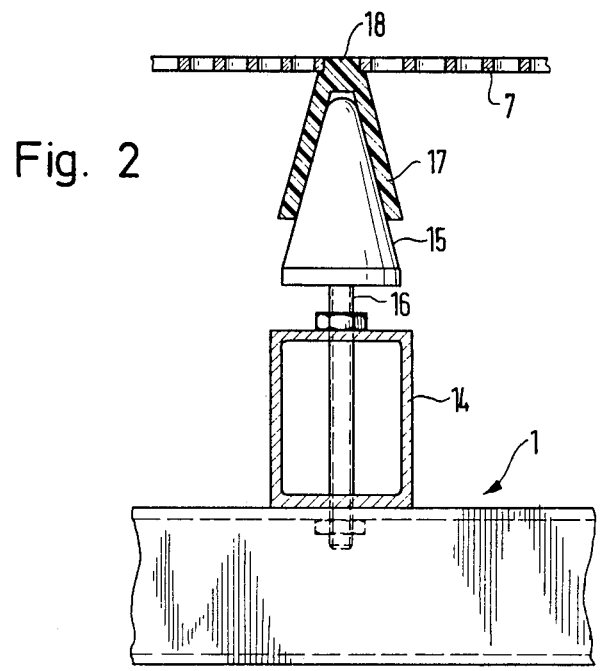
FIG. 2 is a sectional view of a perforated table top of the device and one of a plurality of supports on which the table top bears.

FIG. 2 shows the manner in which the perforated table-top 7 is supported on the bearer strips 14. For this purpose, there are employed a plurality of supports 15 each being vertically adjustable relative to the associated bearer strip 14 by means of a screw-threaded shank 16 of the support. Disposed on each support 15, which includes an upper part of conical shape, is a cowl 17 having the shape of a hollow cone. The hollow cone-shaped cowl 17 has a projection 18 at its upper end fitted into a perforation of the table-top 7. The cowl 17 and the upper part of each support 15 are also made from a material which is a good thermal conductor, preferably from copper or brass, so as to discharge the heat with which the laser beam 10 heats the table-top 7. By vertical adjustment of the supports 15, it is ensured that the focus of laser beam 10 is always properly disposed with respect to the material to be cut.

Figure 3:
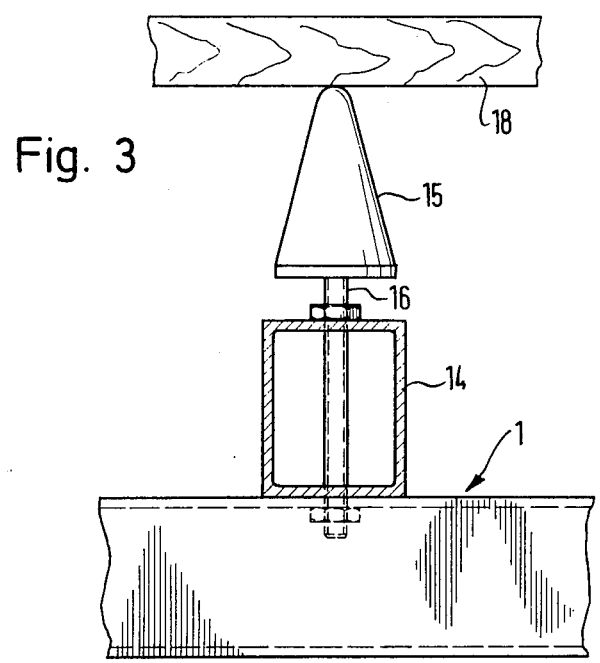
FIG. 3 is a view similar to that of FIG. 2 with certain parts removed.

Referring to FIG. 3, herein the perforated table-top 7 has been removed, as have been the cowls 17. In this case, it is required to cut a timber panel 18 having sufficient natural rigidity so that the latter can be directly supported on the apices of the conically-shaped upper parts of the supports 15.

The fumes produced by the cutting process are sucked-away downwardly either through the perforated table-top 7 or, in the case of FIG. 3, directly downwardly, by a suction means (not shown) disposed below the table-top 7.

What is claimed is:

1. A device for cutting sheet material comprising means for producing a thermal cutting beam, plate-like supporting means for supporting said sheet material in a position in which said thermal cutting beam can cut the sheet material, said plate-like support means having perforations, a plurality of supports, each of said supports including screw means for individual vertical adjustment and an upper conical portion, a cowl seated on each conical portion and having a projection at its upper end insertable in a respective one of perforations in said plate-like supporting means, said plate-like supporting means and said cowls being removable from said conical portion so as to permit rigid sheet material to be supported directly on the conical portions at the apices thereof.

2. A device as claimed in claim 1, in which said supporting means is constituted of a material of high thermal conductivity.

3. A device as claimed in claim 2, in which said material is copper or brass.

4. A device as claimed in claim 1 including suction fume-removal means disposed underneath said supporting means.

5. A device as claimed in claim 1 wherein said means for producing a thermal cutting beam comprises a laser head for producing a laser beam, optical means for directing said beam to said sheet material, a first carriage displaceable longitudinally along said material, and a second carriage supported from the first carriage and displaceable perpendicularly thereof.

6. A device as claimed in claim 5 wherein said optical means comprises a plurality of optical elements respectively supported on said first and second carriages and means for focussing said laser beam at a given distance above the supporting means.

7. A device according to claim 1 including suction fume-removal means disposed underneath said supporting means, said supporting means comprising the material of substantially high thermal conductivity, said material being copper or brass, said means for producing a thermal cutting beam comprising a laser head for producing a laser beam, optical means for directing said beam to sheet material, a first carriage displaceable longitudinally along said material, and a second carriage supported from said first carriage and displaceable perpendicularly thereof, said optical means comprising a plurality of optical elements respectively supported on said first and second carriages and means for focusing said laser beam at a given distance above said supporting means.

* * * * *